US009775465B2

(12) United States Patent
Ahmed

(10) Patent No.: US 9,775,465 B2
(45) Date of Patent: Oct. 3, 2017

(54) FLAME RESISTANT COOKING GRATE AND COOKING APPARATUS

(71) Applicant: W.C. BRADLEY CO., Columbus, GA (US)

(72) Inventor: Mallik Ahmed, Columbus, GA (US)

(73) Assignee: W.C. BRADLEY CO., Columbus, GA (US)

( * ) Notice: Subject to any disclaimer, the term of this patent is extended or adjusted under 35 U.S.C. 154(b) by 1033 days.

(21) Appl. No.: 13/893,579

(22) Filed: May 14, 2013

(65) Prior Publication Data

US 2014/0144333 A1   May 29, 2014

Related U.S. Application Data

(60) Provisional application No. 61/646,983, filed on May 15, 2012.

(51) Int. Cl.
*A47J 27/00* (2006.01)
*A47J 37/07* (2006.01)
*A47J 37/06* (2006.01)

(52) U.S. Cl.
CPC ....... *A47J 37/0786* (2013.01); *A47J 37/0682* (2013.01)

(58) Field of Classification Search
CPC .. A47J 37/067; A47J 37/0682; A47J 37/0704; A47J 37/0713; A47J 37/0786
USPC .................................. 99/425, 444, 445, 446
See application file for complete search history.

(56) References Cited

U.S. PATENT DOCUMENTS

| 182,999 | A | | 10/1876 | Gwynn |
| 333,687 | A | | 1/1886 | Solt, et al. |
| 1,103,992 | A | | 7/1914 | Murray |
| 1,912,868 | A | | 6/1933 | Thompson |
| 1,912,869 | A | | 6/1933 | Thompson |
| 1,938,362 | A | | 12/1933 | Watson |
| 1,956,387 | A | * | 4/1934 | Hartman ............... A47J 37/067 99/446 |

(Continued)

FOREIGN PATENT DOCUMENTS

| CN | 1937945 A | 3/2007 |
| CN | 102186389 A | 9/2011 |

(Continued)

OTHER PUBLICATIONS

PCT/US2013/040985 International Search Report, "Flame Resistant Cooking Grate and Cooking Apparatus," dated Sep. 17, 2013; Published in PCT.

(Continued)

*Primary Examiner* — Quang D Thanh
*Assistant Examiner* — Brandon Harvey
(74) *Attorney, Agent, or Firm* — Dennis D. Brown; Brown Patent Law, P.L.L.C.

(57) ABSTRACT

A cooking apparatus and a cooking grate assembly therefor. The cooking grate assembly includes a food support grate which is positionable on a contoured emitter tray. The contoured emitter tray preferably has either a concave or a convex longitudinal shape. The food support grate is formed of a plurality of side-by-side food support ribs having bottoms which are shaped in a manner corresponding to the contoured shape of the emitter tray so that the bottoms of the ribs run longitudinally along the contoured upper surface of the emitter tray.

14 Claims, 12 Drawing Sheets

(56) References Cited

U.S. PATENT DOCUMENTS

| | | | |
|---|---|---|---|
| 1,959,117 | A | 5/1934 | Thompson |
| 2,174,338 | A | 9/1939 | Warner |
| 2,253,834 | A * | 8/1941 | Herbert ............... A47J 37/0682 126/214 R |
| 2,687,081 | A | 8/1954 | Tucker |
| 2,926,657 | A | 3/1960 | Ford |
| 2,940,381 | A | 6/1960 | Cottongim, et al. |
| 2,965,097 | A | 12/1960 | Clark, Jr. |
| 2,985,097 | A | 5/1961 | Nevin, et al. |
| 3,191,592 | A | 6/1965 | Lorbacher |
| 3,410,540 | A | 11/1968 | Bruckert |
| 3,463,325 | A | 8/1969 | Zagotta, et al. |
| 3,946,651 | A | 3/1976 | Garcia |
| 4,078,664 | A | 3/1978 | McConnell |
| 4,149,516 | A | 4/1979 | Hall |
| 4,159,291 | A | 6/1979 | Bruckert et al. |
| 4,161,168 | A | 7/1979 | Cagle |
| 4,403,597 | A | 9/1983 | Miller |
| 4,418,863 | A | 12/1983 | Kimbrell, Sr. |
| 4,541,992 | A | 9/1985 | Jerge et al. |
| 4,703,746 | A | 11/1987 | Hitch |
| 4,930,491 | A | 6/1990 | Purello |
| 4,955,490 | A | 9/1990 | Schafer |
| 4,979,440 | A | 12/1990 | Latour et al. |
| 5,105,725 | A | 4/1992 | Haglund |
| 5,172,628 | A | 12/1992 | Pillsbury et al. |
| 5,237,914 | A | 8/1993 | Carstensen |
| D340,835 | S | 11/1993 | Lupa |
| D341,292 | S | 11/1993 | Johnston |
| 5,277,106 | A | 1/1994 | Raymer et al. |
| 5,347,978 | A | 9/1994 | Zuran |
| 5,355,780 | A | 10/1994 | Campbell |
| 5,355,868 | A | 10/1994 | Haen |
| 5,453,574 | A | 9/1995 | Zuran et al. |
| 5,467,691 | A | 11/1995 | Koziol |
| D364,995 | S | 12/1995 | Koziol |
| 5,628,415 | A | 5/1997 | Mulholland |
| 5,735,260 | A | 4/1998 | Rimback |
| 5,911,812 | A | 6/1999 | Stanek et al. |
| 5,974,954 | A | 11/1999 | Rigney et al. |
| 6,024,081 | A | 2/2000 | Libertini, Jr. |
| 6,087,634 | A | 7/2000 | Cook et al. |
| 6,105,798 | A | 8/2000 | Gruber et al. |
| 6,114,666 | A | 9/2000 | Best |
| 6,186,931 | B1 | 2/2001 | Calvert et al. |
| 6,260,478 | B1 | 7/2001 | Harneit |
| 6,314,870 | B1 | 11/2001 | Staller et al. |
| 6,389,961 | B1 * | 5/2002 | Wu ..................... A47J 37/0694 99/339 |
| 6,481,343 | B1 | 11/2002 | Rigney et al. |
| 6,520,174 | B1 | 2/2003 | Scigliuolo |
| 6,644,175 | B2 | 11/2003 | Stephen et al. |
| 6,705,307 | B2 | 3/2004 | Alden et al. |
| 7,066,169 | B2 | 6/2006 | Feldewerth et al. |
| 7,207,326 | B2 | 4/2007 | McKenzie et al. |
| 7,810,487 | B2 | 10/2010 | Johnston |
| 8,037,879 | B2 | 10/2011 | Murrin et al. |
| 2002/0189604 | A1 | 12/2002 | McKenzie |
| 2006/0003279 | A1 | 1/2006 | Best |
| 2006/0021517 | A1 | 2/2006 | Best |
| 2007/0125357 | A1 * | 6/2007 | Johnston ............. A47J 37/0694 126/41 R |
| 2008/0072890 | A1 | 3/2008 | Best |
| 2008/0121117 | A1 | 5/2008 | Best |
| 2009/0202688 | A1 | 8/2009 | Best |
| 2009/0308374 | A1 | 12/2009 | Ahmed |
| 2010/0095951 | A1 | 4/2010 | Ahmed |
| 2011/0011388 | A1 | 1/2011 | Johnston |
| 2014/0144333 | A1 | 5/2014 | Ahmed |

FOREIGN PATENT DOCUMENTS

| | | |
|---|---|---|
| DE | 202011101282 U1 | 1/2012 |
| EP | 1 776 028 B1 | 10/2008 |
| EP | 2849618 A1 | 3/2015 |
| WO | WO 2009/152530 A2 | 12/2009 |
| WO | 2012083063 | 6/2012 |
| WO | 2012083063 A1 | 6/2012 |
| WO | 2013173362 A1 | 11/2013 |

OTHER PUBLICATIONS

PCT/US2013/040985 ISA Written Opinion, "Flame Resistant Cooking Grate and Cooking Apparatus", Sep. 17, 2013; Published in: PCT.

State Intellectual Property Office of People's Republic China; Search Report; Nov. 24, 2015; China.

State Intellectual Property Office of People's Republic China; Supplemental Search Report; Jun. 27, 2016; China.

Extended Supplementary European Search Report; dated Apr. 29, 2016; Europe.

Canadian Search Report; dated Apr. 18, 2016; Canada.

European Communication pursuant to Article 94(3) EPC; dated May 17, 2017; Europe.

* cited by examiner

US 9,775,465 B2

FLAME RESISTANT COOKING GRATE AND COOKING APPARATUS

RELATED CASE

This application claims the benefit of U.S. Provisional Patent Application Ser. No. 61/646,983 filed on May 15, 2012 and incorporates said provisional application by reference into this document as if fully set out at this point.

FIELD OF THE INVENTION

The present invention relates to cooking grates and grate assemblies which support food items for cooking in outdoor grills and in other cooking systems. The invention also relates to cooking systems which utilize such grates or grate assemblies.

BACKGROUND OF THE INVENTION

Outdoor grilling systems which primarily utilize infrared radiant energy for cooking food items are known in the art. The beneficial results which these systems are capable of providing over conventional convective grills are also well known. However, there are various shortcomings which are often associated with the current infrared grilling systems.

Consequently, a continuing need exists for improved cooking grate structures or assemblies for infrared grills which will: (a) allow lower cost burners or other heating elements to be used for providing excellent infrared cooking results, (b) reduce or eliminate flare-ups, (c) greatly reduce the preheating time required to reach cooking temperature, and (d) rapidly provide high contacting temperatures for searing the food product and producing attractive grill marks. In addition, a continuing need exists for improved infrared cooking systems which will (1) provide increased thermal efficiency and/or (2) provide and transmit a high percentage of infrared cooking energy to the food product.

A prior art infrared grill 2 for outdoor cooking is depicted in FIG. 1. The prior art grill 2 allows the use of simple low-cost burner elements and is also somewhat effective for reducing flare-ups. The prior art grill 2 comprises: a grill housing 4; a pivotable lid or other cover 6 for opening and closing the top of the grill housing 4; one or more, typically two or three, tube burner elements 8 extending through the housing 4 from the front 10 of the housing to the back 12 thereof; a deep concave emitter tray 14 which is positioned above the burner elements 8 and extends laterally across the width of the housing 4 from the left side to the right side thereof; and an open food support grate 16 positioned in the top opening 15 of the housing 4 above the concave emitter tray 14.

As seen in the front to back cross-sectional view provided in FIG. 1, the prior art concave emitter tray 14 used in the grill 2 is a deep tray wherein: the lowest point 18 of the concave upper surface 20 of the prior art tray 14 is at or near the cross-sectional midpoint of the tray 14; the emitter tray 14 has front and back edges 22 and 24 which are elevationally positioned substantially at the top opening of the housing 4; the food support grate 16 has front 26 and back 28 ends which are supported respectively on the front and back edges 22 and 24 of the concave emitter tray 14; and the front and back edges 22 and 24 of the emitter tray 14 are supported at or near the upper opening of the housing 4 by support prongs (not shown) such that an elongate lateral front gap 30 and an elongate lateral back gap 32 are provided between (a) the elongate front and back edges 22 and 24 of the emitter tray and (b) the front and back walls 10 and 12 of the housing 4. Combustion gases generated by burner elements 8 flow upwardly through the front and back lateral gaps 30 and 32 when the grill is in operation.

Each of the tube burner elements 8 used in the prior art grill 2 has two rows 33 of fuel ejection ports which run along both the left and the right sides of the tube element 8 thereof for producing a horizontal row of flames on each side of the burner element 8. As is also typical in gas-powered grills, each of the burner elements 8 is part of a burner assembly which comprises: a fuel supply line 34 for delivering propane or other suitable gas fuel from a fuel tank or other fuel source (not shown); a control knob 36 for selectively controlling the fuel rate and for shutting off the flow of fuel to the burner element 8; and a venturi element or other air induction or injection device 38 for drawing or injecting air into the burner element 8 for mixture with the fuel. Slots or other openings 40 are formed in the firebox bottom wall 42 of the housing 4 beneath the burner elements 8 for providing secondary air for the burners.

Due to its concave shape, the prior art emitter tray 14 of the cooking grill 2 is effective for providing a more uniform distribution of infrared radiant cooking energy in the cooking plane on top of the food support grate 16. However, during cooking, fat drippings may at times remain on the trough 14 so that the fat will ignite and flare up when cooking at a sufficiently high temperature to leave sear marks on the product. Moreover, when cooking at low temperature, the fat may at times accumulate in the bottom of the concave tray 14 such that the accumulated grease can catch fire if the temperature of the grill 2 is raised, for example, for thermally cleaning the emitter tray 14.

Although the prior art grill 2 has provided significant benefits and improvements to the industry, an entirely satisfactory solution for addressing the flare-up and fat accumulation problems encountered with the prior art concave emitter tray 14 has not yet been developed. For example, placing one or more drainage holes in the bottom of the prior art concave emitter tray 14 in order to drain the fat therefrom would be problematic in that (a) the flow of air upwardly through the drainage holes would promote the ignition of the fat on the tray and increases flare-up intensity while the food is being cooked and (b) fat flowing through the holes would ignite and flare upwardly within the firebox housing 4 against the bottom of the concave emitter 14.

Consequently, a continuing need exists for a more effective infrared cooking grate system which will provide superior radiant flux distribution in the cooking plane while at the same time substantially eliminating the occurrence of flare-ups both on top of and below the grate assembly.

SUMMARY OF THE INVENTION

The present invention provides an infrared cooking grate assembly which satisfies the needs and alleviates the problems discussed above. The present invention also provides a cooking grill comprising the inventive infrared grate assembly positioned within, at, or near an upper opening of the grill housing.

The inventive cooking grate assembly preferably comprises a food support structure which is preferably removably positionable on a radiating plate. The food support structure preferably comprises a side-by-side series of parallel, spaced apart food support ribs. Each of the food support ribs extends from a first longitudinal end to a second longitudinal end of the food support structure. The food support ribs are preferably hollow structures which have open bottoms.

The contour of the upper surface of the radiating plate is preferably such that the upper surface includes at least one lower region from which hot grease and fat will drain from the radiating plate. Most preferably, the lower region extends across the lateral width of the radiating plate so that the lower region is substantially perpendicular to the longitudinally extending food support ribs. In addition, the contour of the upper surface of the radiating plate also includes at least one upper region, the upper region being elevationally higher than the lower region such that hot fat and grease which drips onto the radiating plate will flow down the upper surface of the radiating plate from the upper region to the lower region. The upper region also most preferably extends across the lateral width of the radiating plate so that the upper region is substantially perpendicular to the longitudinally extending food support ribs.

In another aspect of the inventive cooking grate assembly, although the tops of the food support ribs preferably extend substantially horizontally from the first longitudinal end to the second longitudinal end of the food support structure, the bottoms of the food support ribs preferably have a contoured shape which substantially corresponds to the contour of the upper surface of the radiating plate so that the bottoms of the food support ribs substantially run along and substantially contact the longitudinal contour of the upper surface of the radiating plate.

In a further aspect, as mentioned above, the food support ribs are preferably hollow structures which have open bottoms. In addition, the bottom edges of the sidewalls of the ribs preferably run along and contact the contoured upper surface of the radiating plate in a non-sealed manner such that, during cooking, hot fat and grease which falls onto the radiating plate in the gaps between the food support ribs can flow beneath the bottom edges of the rib sidewalls for draining from the cooking grate assembly. This further reduces the possibility of flare-ups as will be seen below.

Further aspects, features, and advantages of the present invention will be apparent to those of ordinary skill in the art upon examining the accompanying drawings and upon reading the following detailed description of the preferred embodiments.

DETAILED DESCRIPTION OF THE PREFERRED EMBODIMENTS

Figure 1:
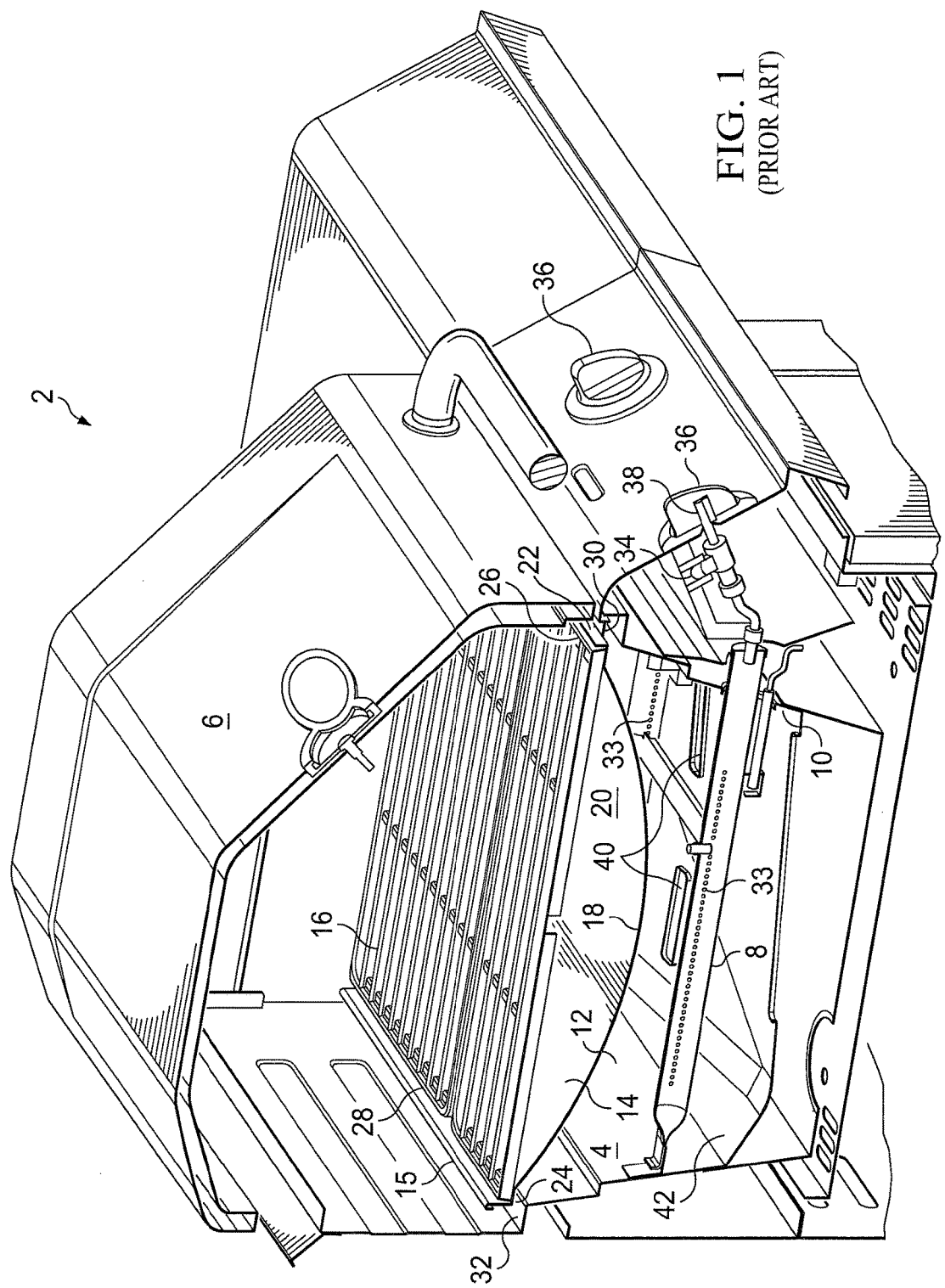
FIG. 1 is a cross-sectional perspective view of a prior art infrared grill 2.
Figure 2:
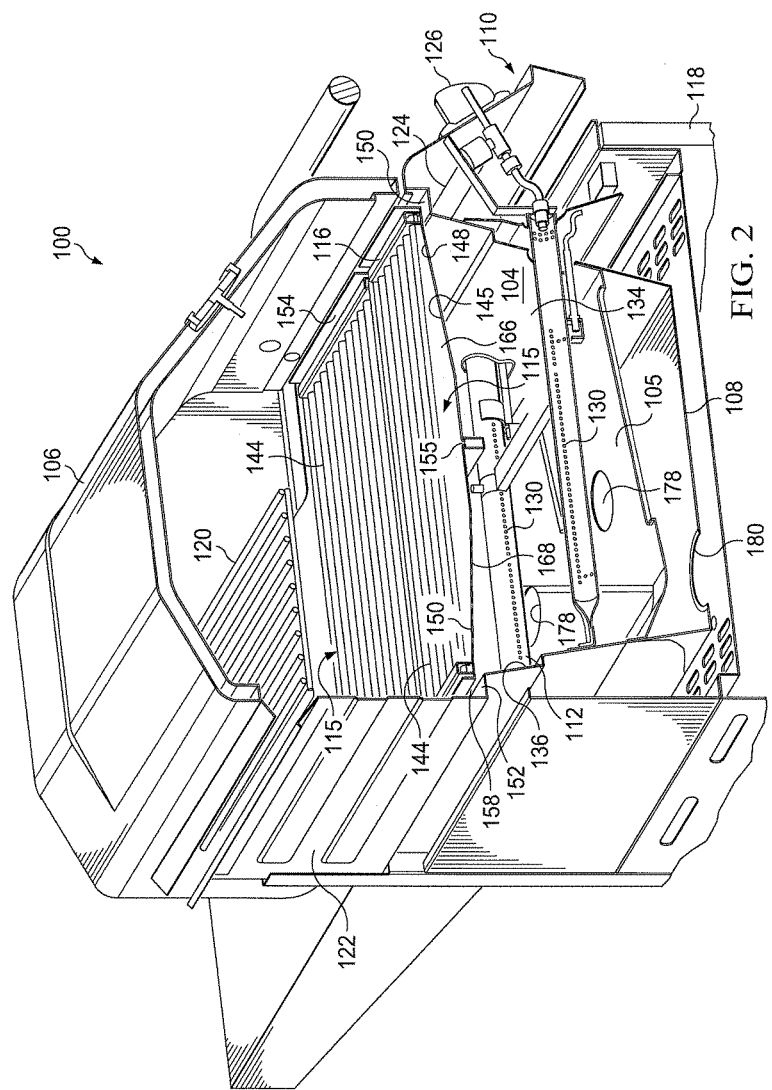
FIG. 2 is a cross-sectional perspective view (back-to-front cross-section) of an embodiment 100 of the inventive grill.
Figure 3:
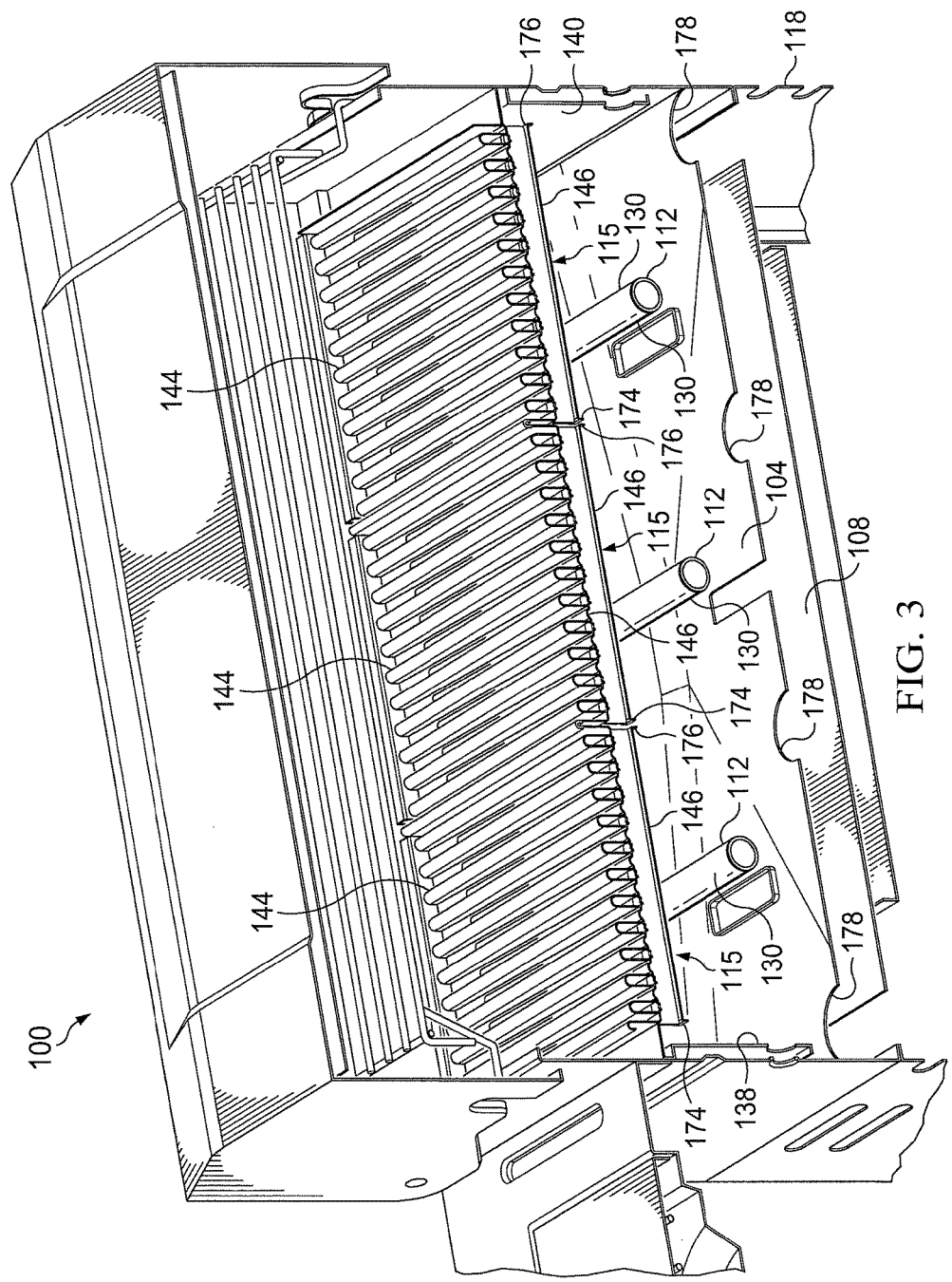
FIG. 3 is another cross-sectional perspective view (side-to-side lateral cross-section) of the inventive grill 100.

An embodiment 100 of the inventive infrared grill is depicted in FIGS. 2 and 3. The inventive grill 100 comprises: a grill housing 104; a pivotable lid or other cover 106 for opening and closing the top opening 116 of the grill housing 104; a firebox bottom wall 105 extending within the lower portion of the grill housing 104 and spaced above the bottom wall 108 of the housing 104; one or more burner assemblies 110 having burner elements 112 positioned within the grill housing 104 above the firebox bottom wall 105; one or more inventive infrared cooking grate assemblies 115 positioned above the burner elements 112 and preferably positioned at or near the top opening 116 of the grill housing 104; a support stand or other support structure 118 for supporting and holding the grill housing 104; and a warming rack 120 attached to an upwardly extending back wall 122 of the grill housing 104 or otherwise retained in the inventive grill 100 at an elevated position above the one or more cooking grate assemblies 115.

Each of the one or more burner assemblies 110 used in the inventive grill 100 can be a tube burner assembly, a pan burner assembly, a box burner assembly, an infrared burner assembly, or generally any other type of burner assembly known in the art. Alternatively, the one or more burner assemblies 110 used in the grill 100 can be replaced with electric heating elements or with a charcoal fire.

In the embodiment illustrated in FIGS. 2 and 3, the inventive grill 100 has three gas burner assemblies 110 for creating and selectively controlling three side-by-side cooking zones in the grill 100. Each of the burner assemblies 110 is a gas burner assembly which preferably comprises: a tube burner element 112 which extends from front to back through the lower portion of the grill housing 104 above the firebox bottom wall 105; a fuel supply line 124 for delivering propane or other suitable gas fuel from a fuel tank of other source (not shown); a front control knob 126 for selectively controlling the fuel rate and for shutting off the flow of fuel to the burner element 112; and a venturi element or other air induction or injection device 128 for drawing or injecting primary air into the burner element 112 for mixture with the fuel. Although generally any desired burner port arrangement can be used, each of the tube burner elements 112 preferably has two rows 130 of flame discharge ports which respectively extend longitudinally along the left and right sides of the tube burner element 112 for producing a substantially horizontally projecting row of flames along each of the left and the right sides of the tube burner element 112.

Figure 12:
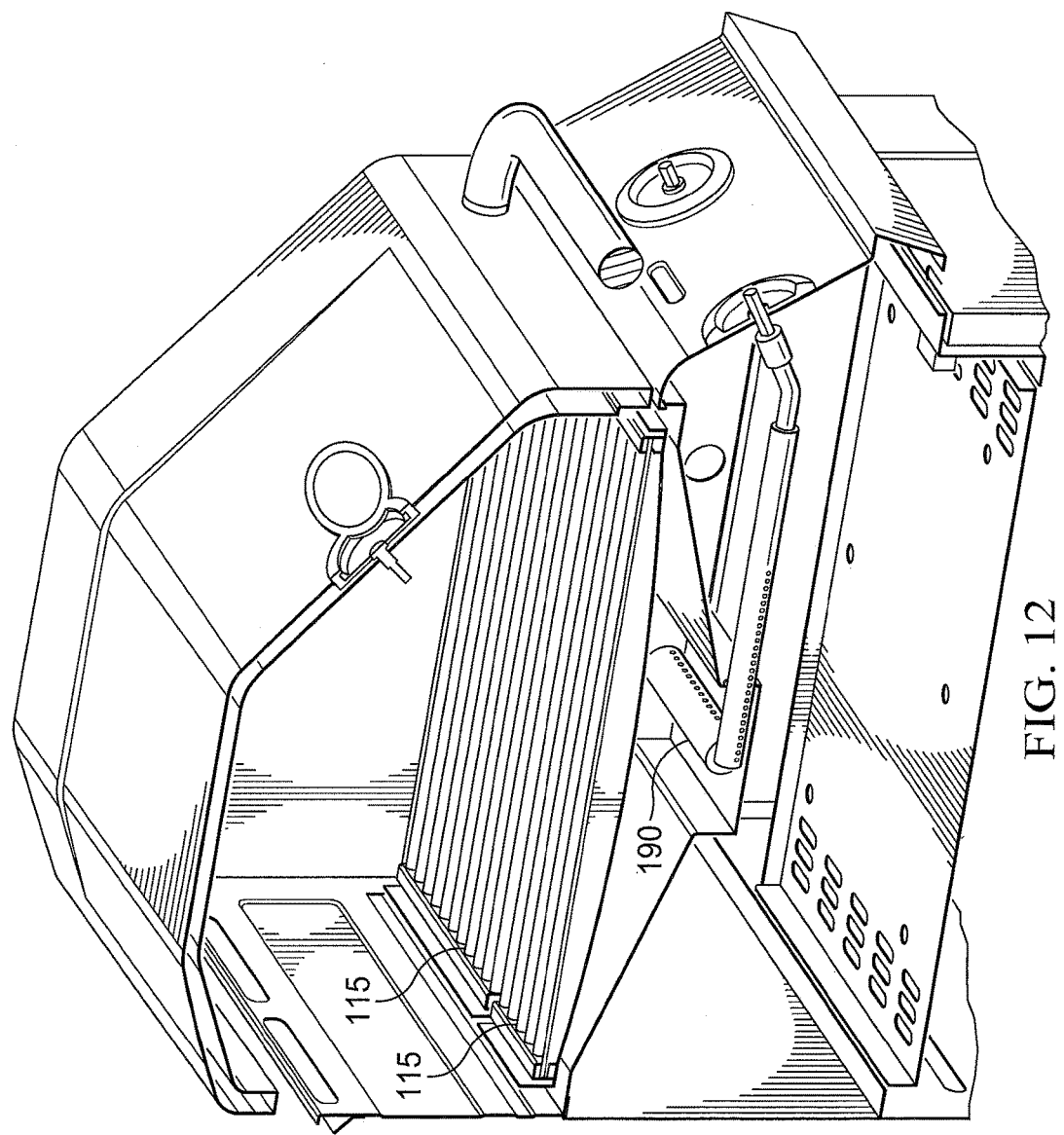
FIG. 12 is a cross-sectional perspective view (front-to-back) of an alternative embodiment of the inventive grill 100 which uses a laterally extending series of substantially co-linear tube burner elements 190.

Although in the inventive grill 100 the burner elements 112 extend through the lower portion of the grill housing 104 in a front-to-back direction (i.e., from the front wall 134 toward the back wall 136 of the grill housing 104), it will be understood that the inventive grill 100 could alternatively utilize one or more burner assemblies having burner elements which extend from side-to-side (i.e., from the left lateral side 138 to the right lateral side 140 of the grill housing 104) rather than extending from front-to-back. By way of example, an alternative embodiment of the inventive grill 100 which uses a laterally extending series of substantially co-linear tube burner elements 190 is illustrated in FIG. 12.

The embodiment of the inventive grill 100 depicted in FIGS. 2 and 3 uses three inventive grate assemblies 115 which extend from front-to-back and are removably positionable in a side-by-side relationship at or near the top opening 116 of the grill housing 104. The three front-to-back tube burner elements 112 used in grill 100 are each centrally positioned below a separate one of the three cooking grate assemblies 115 so that each of the three cooking grate assemblies 115 is positioned within and operates to further define a separate one of the three side-by-side cooking zones provided by the three burner elements 112.

Although the embodiment 100 of the inventive grill shown in FIGS. 2 and 3 utilizes three side-by-side cooking grate assemblies 115 which each run from front-to-back, it will be understood that the inventive grill 100 could alternatively include one, two, or any other number of inventive grate assemblies 115 which run from front-to-back with respect to the grill housing 104 or run laterally from side-to-side.

The inventive cooking grate assembly 115 used in grill 100 is illustrated in FIGS. 2-6. The inventive assembly 115 comprises: an emitter tray 142; a food support grate 144 which is preferably removably positionable on the emitter tray 142; and a drainage channel 146 attached to the bottom of the emitter tray 142 for receiving grease and fat drippings which drain from the emitter tray 142 and for carrying the grease and fat to one or more desired discharge points.

The inventive cooking grate assembly 115 also includes a plurality of support prongs 149 which are attached to the bottom of the emitter tray 142 and project from the longitudinal ends of the tray 142 for supporting the emitter tray 142 on a front ledge 150 and a back ledge 152 provided in the grill housing 104 proximate the top opening 116 thereof. The support prongs 149 removably support the cooking grate assembly 115 on the upper front and back ledges 150 and 152 of the grill housing 104 such that a front lateral combustion gas flow gap 154 is provided between the forward longitudinal end 156 of the grate assembly 115 and the front support ledge 150 of the grill housing 104 and a rear lateral combustion gas flow gap 158 is formed between the rearward longitudinal end 160 of the cooking grate assembly 115 and the back support ledge 152 of the grill housing 104.

Figure 6:
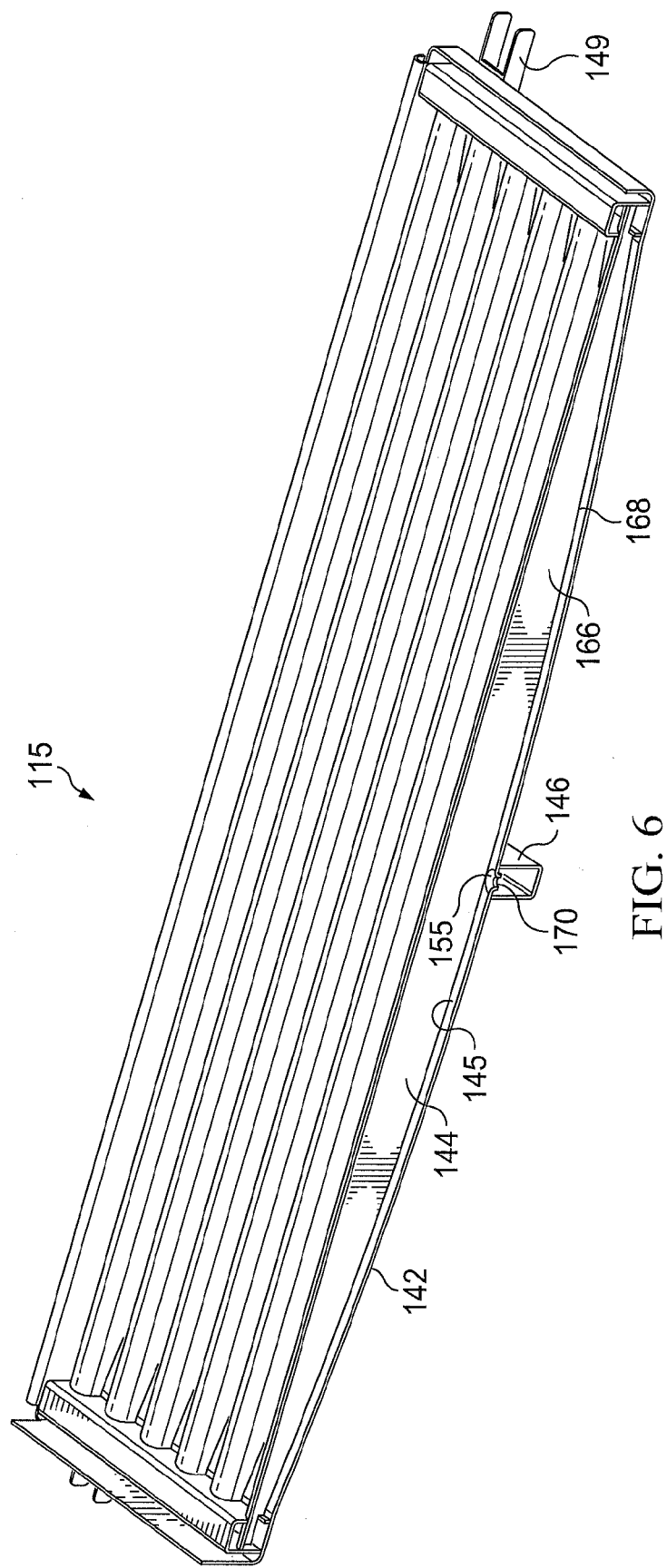
FIG. 6 is another cross-sectional perspective view (longitudinal cross-section) of the inventive cooking grate assembly 115.

In the longitudinal cross-section views provided in FIGS. 2 and 6, the emitter tray 142 of the inventive grate assembly 115 has a shallow concave shape. Consequently, the longitudinal contour of the upper surface 145 of the tray 142 is such that (a) a lower bottom region 155 is formed substantially in the center of the tray 142 and preferably extends across the lateral width of the tray 142, (b) the forward and rearward longitudinal ends 148 and 150 of the tray surface 145 form upper regions which are at a higher elevation than the lower bottom region 155 of the tray 142, and (c) the upper surface 145 of the emitter tray 142 curves downwardly from each of the forward and rearward longitudinal ends 148 and 150 to the bottom 146 so that all fat and grease which drips onto the tray 142 will flow downwardly along the contoured upper surface 145 to the lower bottom region 155 of the tray 142.

The emitter tray 142 also preferably has longitudinally extending left and right vertical sidewalls 152 and 153 which prevent grease and fat from draining off of the sides of the tray 142. The right sidewall 153 preferably has a longitudinally-extending lip 157 (e.g., a curved lip or a squared lip) formed along the top thereof so that, when placed in the grill housing 104, the lip 157 will overlap the left side wall 152 of an adjacent tray 142 in order to block the flow of air upwardly between the adjacent cooking grate assemblies 115.

The food support grate 144 preferably comprises a side-by-side series of parallel, longitudinally-extending food support ribs 159 which are connected to and extend from a lateral cross support 161, or more preferably extend between a pair of opposing lateral cross supports 161 and 162 at the forward and rearward longitudinal ends of the grate structure 144. The food support ribs 159 can be solid structures but are preferably hollow structures which have an inverted U cross-sectional shape with a rounded top 164. Alternatively, the cross-sectional shape of the hollow support ribs 159 can be a rectangular or square shape, an inverted V-shape, a combination of such shapes, or any other desired geometry.

The longitudinally-extending left and right side walls 166 of each of the food support ribs 159 have bottom edges 168 which are preferably formed and shaped to correspond to, (i.e., to substantially match) the contour of the upper surface 145 of the emitter tray 142 so that when the food support grate 144 is placed on the emitter tray 142, the bottom edges 168 of the food support ribs 159 will run along and contact the concave contour of the emitter tray 142, thus further reducing flare-ups by helping to block lateral air flow across the emitter tray 142. However, because the contact between the side wall bottom edges 168 of the ribs 159 and the emitter tray 142 is not sealed, hot grease and fat which drips into the longitudinal gaps 172 between the ribs 159 during the cooking process will be able to flow beneath the rib sidewalls 166.

In order to drain the grease and fat which drips onto the emitter tray 142, a series of drainage apertures 170 extends laterally across the emitter tray 142, preferably at the lowest point 155 at the bottom of the tray 142. The drainage apertures 170 are also preferably sized, positioned, and spaced such that the drainage apertures 170 will be located beneath the food support ribs 159 when the grill 100 is in operation. The placement of the drainage apertures 170 beneath the food support ribs 159 assists in preventing flare-ups by helping to minimize or prevent any upward air flow through the drainage apertures 170 from flowing into the open gaps 172 between the ribs 159. However, as indicated above, the hot grease and fat drippings which fall onto the emitter tray 142 will readily drain from the tray 142 by flowing beneath the unsealed bottom edges 168 of the rib side walls 166 toward the drainage apertures 170.

Figure 5:
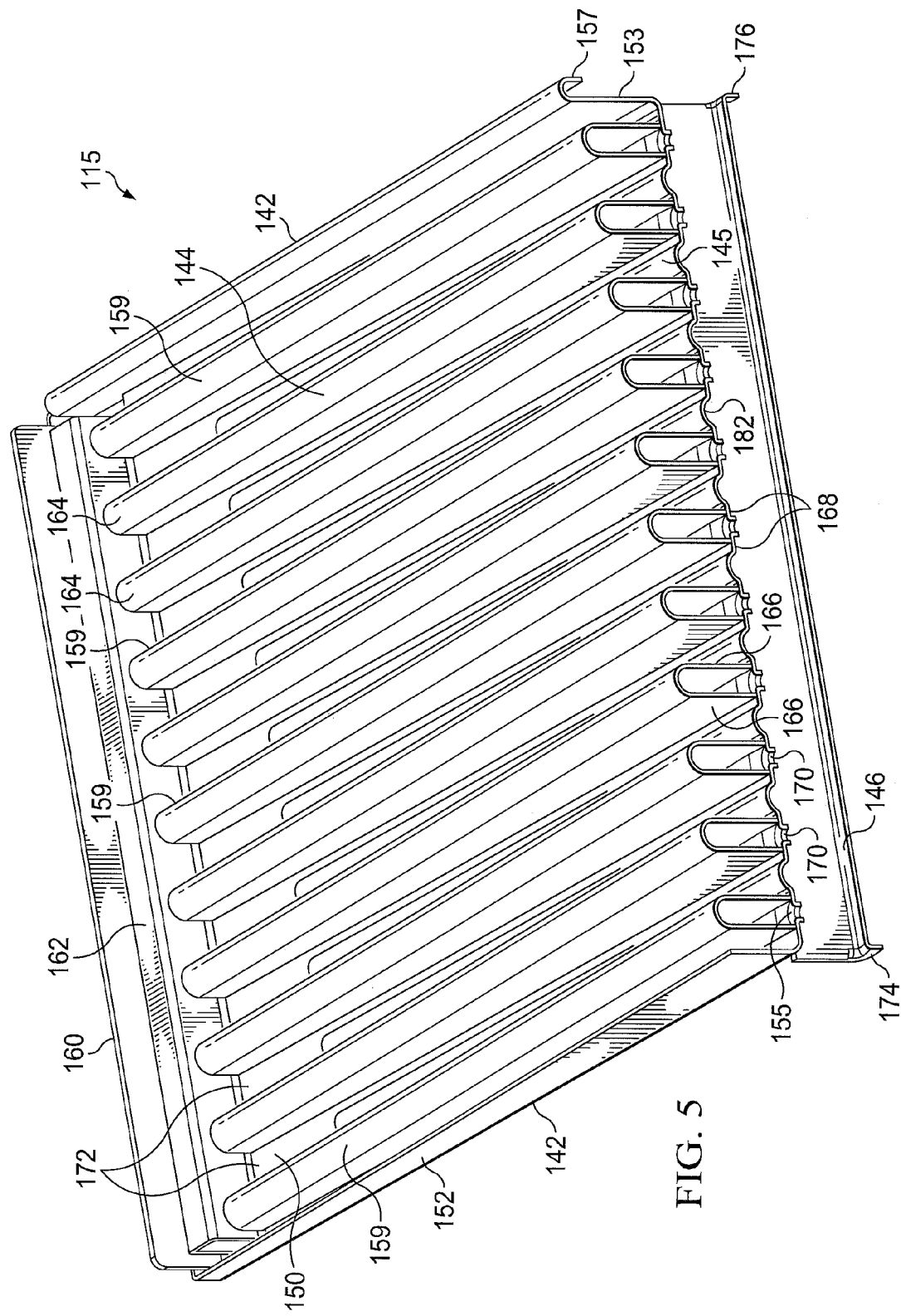
FIG. 5 is a cross-sectional perspective view (lateral cross-section) of the inventive cooking grate assembly 115.

The hot grease and fat material flowing through the drainage apertures 170 falls into the drainage channel 146 which extends laterally across the bottom of the emitter tray 142 beneath the drainage apertures 170. The drainage channel 146 can be level, as shown in FIGS. 3 and 5, so that the grease and fat which falls into the drainage channel will drain from both of the left and right ends 174 and 176 of the channel 146. Alternatively, the channel 146 could be sloped such that the grease and fat would only drain from one end 174 or 176 thereof.

To prevent the grease and fat which falls from the ends 174 and 176 of the drainage channel 146 from igniting and flaring within the firebox 104 of the inventive grill 100, holes 178 are preferably formed in the firebox bottom wall 105 beneath the ends 174 and 176 of the drainage channel 146 so that the grease and fat flowing from the drainage channel 146 falls directly through the holes 178 onto the bottom wall 108 of the grill housing 104 or alternatively falls onto a drip pan (not shown) which could be installed beneath the firebox bottom wall 105. In addition, the respective locations of the burner elements 112 and the ends 174 and 176 of the drainage channels 146 are preferably such that the fat and grease falling from the ends 174 and 176 of the drainage channels 146 will not fall onto a burner element 112. A hole 180 is also preferably provided in the bottom wall 108 of the grill housing 104 for draining the grease and fat drippings from the bottom of the grill housing 104 into a can or other container.

Further, while operating to prevent or minimize flare-ups in the grill firebox beneath the concave emitter tray 142, the drainage channel structures 146 also assist in further inhibiting the occurrence of flare-ups on top of the emitter tray 142 by blocking a significant amount of air which would otherwise flow directly upward through the drainage apertures 170.

Figure 4:
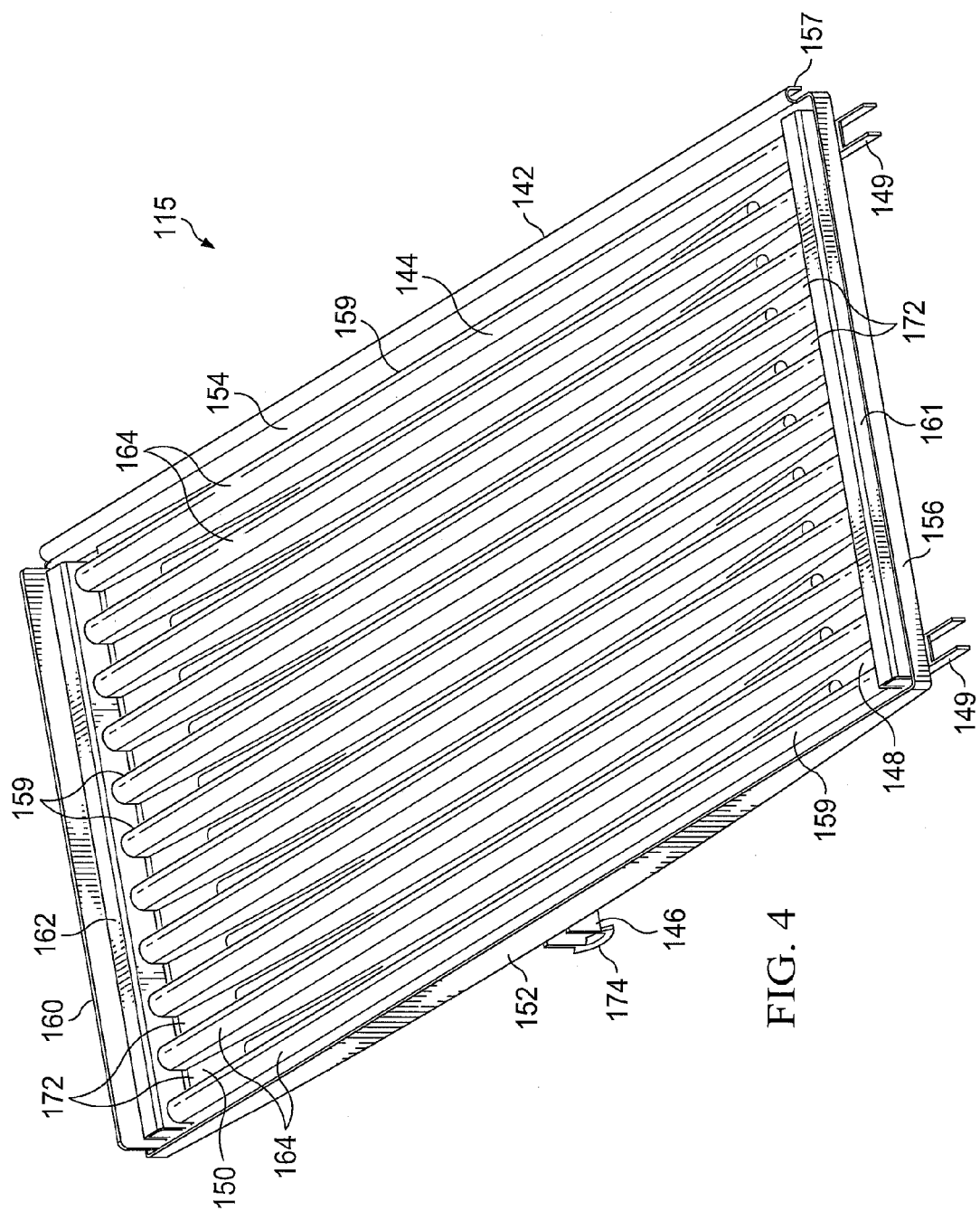
FIG. 4 is a top perspective view of an embodiment 115 of the inventive cooking grate assembly.

To also assist in draining grease and fat drippings from the emitter tray 142 and to prevent the accumulation of grease and fat in the gaps 172 between the food support ribs 159, the emitter tray 142 can optionally also have a series of longitudinally-extending raised features 182 formed therein which extend longitudinally in the gaps 172 between the food support ribs 159, but are preferably significantly shorter than the support ribs 159 in vertical height. Although the raised parallel features 182 are illustrated in FIGS. 3-5 as having a short inverted U-shape, it will be understood that the cross-sectional shape of the longitudinally-extending raised features 182 could alternatively be an inverted V-shape or any other shape which will assist in causing the grease and fat which collects in the rib gaps 172 to quickly drain beneath the bottom edges 168 of the food support ribs and through the drainage apertures 170.

Rather than having raised features 182 formed in the emitter tray 142, it will be understood that the emitter tray 142 can be smooth with no features formed therein or can alternatively have elongate shallow channels having U, V, or other cross-sectional shapes positioned between the food support ribs 159. Although the formation of shallow parallel channels in the emitter tray does not assist in draining grease from the tray in the same manner as the raised parallel features 182, the use of either raised features 182 or shallow channels significantly enhances the structural strength of the emitter tray.

The emitter tray 142 can be formed of generally any material which will withstand operating temperatures of at least 500° F. and which preferably also (a) is at least minimally corrosion resistant and (b) has a preferred emissivity of at least 0.3 (more preferably at least 0.5, and most preferably at least 0.7). Examples of suitable materials include, but are not limited to, porcelain coated steel, oxidized stainless steel, (e.g., stainless steel which will naturally oxidize after a few cooking cycles), aluminum, or cast iron.

By way of example, but not by way of limitation, the food support ribs 159 can be formed of any of the same suitable and preferred materials discussed above for use in forming the emitter tray 142. Further, the food support ribs 159 can also optionally be treated with a corrosion-resistant and/or nonstick coating such as porcelain, PTFE, silicon oxide ceramic, tantalum, or other known coating technologies.

The emitter tray 142 is preferably a shallow concave tray wherein the lowest bottom point 155 of the upper surface 145 of the emitter tray 142 is located at an elevation which is preferably not more than 1.5 inches, more preferably not more than 1.25 inches, lower than the elevation of the forward and rearward longitudinal ends 148 and 150 of the concave upper surface 145. More preferably, the depth of the concave surface 145 at the lowermost point 155, as compared to the longitudinal forward and rearward ends 148 and 150 of the upper surface 155, will be in the range of from about 0.5 to about 1 inch.

In addition, the depth and contour of the concave upper surface 145 of the emitter tray 142 and the vertical height of the food support ribs 159 will preferably be such that (a) the horizontally extending tops 164 of the ribs 159 will be in the range of from about 0.25 to about 0.75 inch, more preferably from about 3/8 to about 5/8 inch, above the upper surface 145 of the concave emitter tray 142 at the forward and rearward longitudinal ends 148 and 150 of the tray surface 145 and (b) the horizontally extending tops 164 of the food support ribs 159 will preferably be in the range of from about 0.5 to about 1.75 inches, more preferably from about 0.625 to about 1.25 inches and more preferably from about 0.875 to about 1.125 inches, above the lowest point 155 of the upper surface 145 of the concave emitter tray 142 at the center of the tray 142.

The lateral width of each support rib 159 will preferably be in the range of from about 3/16 to about 7/16 inch and will more preferably be in the range of from about 1/4 to about 3/8 inch. The lateral width of the gaps 172 formed between the food support ribs 159 will preferably be in the range of from about 5/16 to about 9/16 inch and will more preferably be in the range of from about 3/8 to about 1/2 inch.

It will also be understood that the downwardly dipping emitter tray 142 of the cooking grate assembly 115 need not be concave or strictly concave. As an example of an alternative embodiment of the inventive cooking grate assembly 115, the shallow concave emitter tray 142 could be replaced with another type of downwardly dipping emitter tray having a shallow V or a shallow rounded V-shape. In conjunction with this change in the dipping contour of the tray, a corresponding change would be made to the shape of the bottom edges of the sidewalls of the food support ribs so that the bottoms of the ribs would contact and run along the shallow V-like contour of the alternative emitter tray. The depth of the alternative tray at its lowest point and the height of the tops of the food support ribs above the lowest and highest points of the emitter tray will preferably be the same as set forth above for the concave emitter tray 142 and food support ribs 159.

Another alternative embodiment 200 of the inventive grill is depicted in FIGS. 7-11. The inventive grill 200 is identical to the inventive grill 100 described above except that, instead of the concave cooking grate assemblies 115 used in grill 100, the grill 200 uses inventive cooking grate assemblies 202 which employ convex emitter trays 204 and correspondingly configured food support grates 205 which are removably positioned on the convex trays 204.

Figure 7:
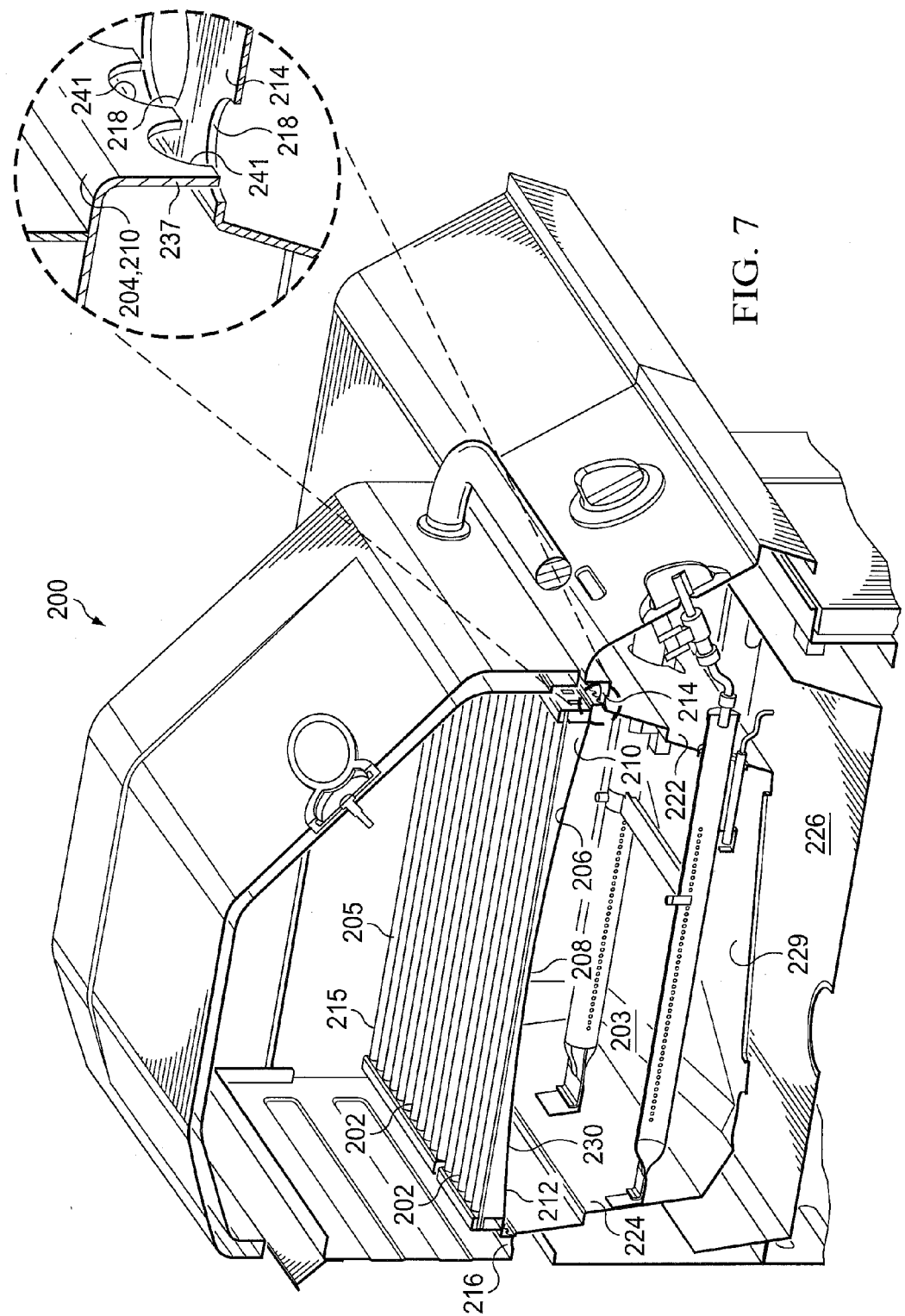
FIG. 7 is a cross-sectional perspective view (front-to-back cross-section) of an alternative embodiment 200 of the inventive grill.
Figure 8:
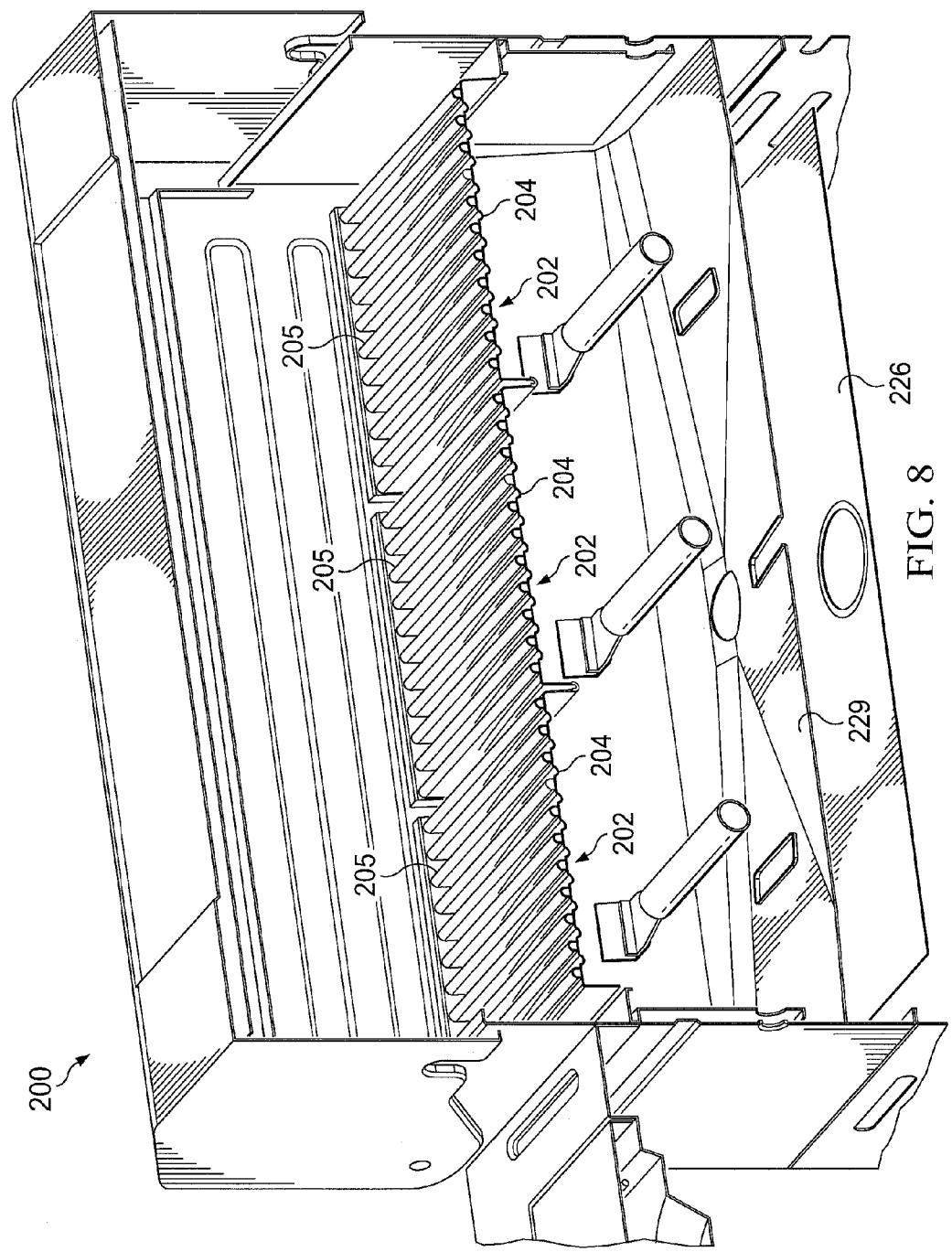
FIG. 8 is another cross-sectional perspective view (side-to-side lateral cross-section) of the inventive grill 200.
Figure 9:
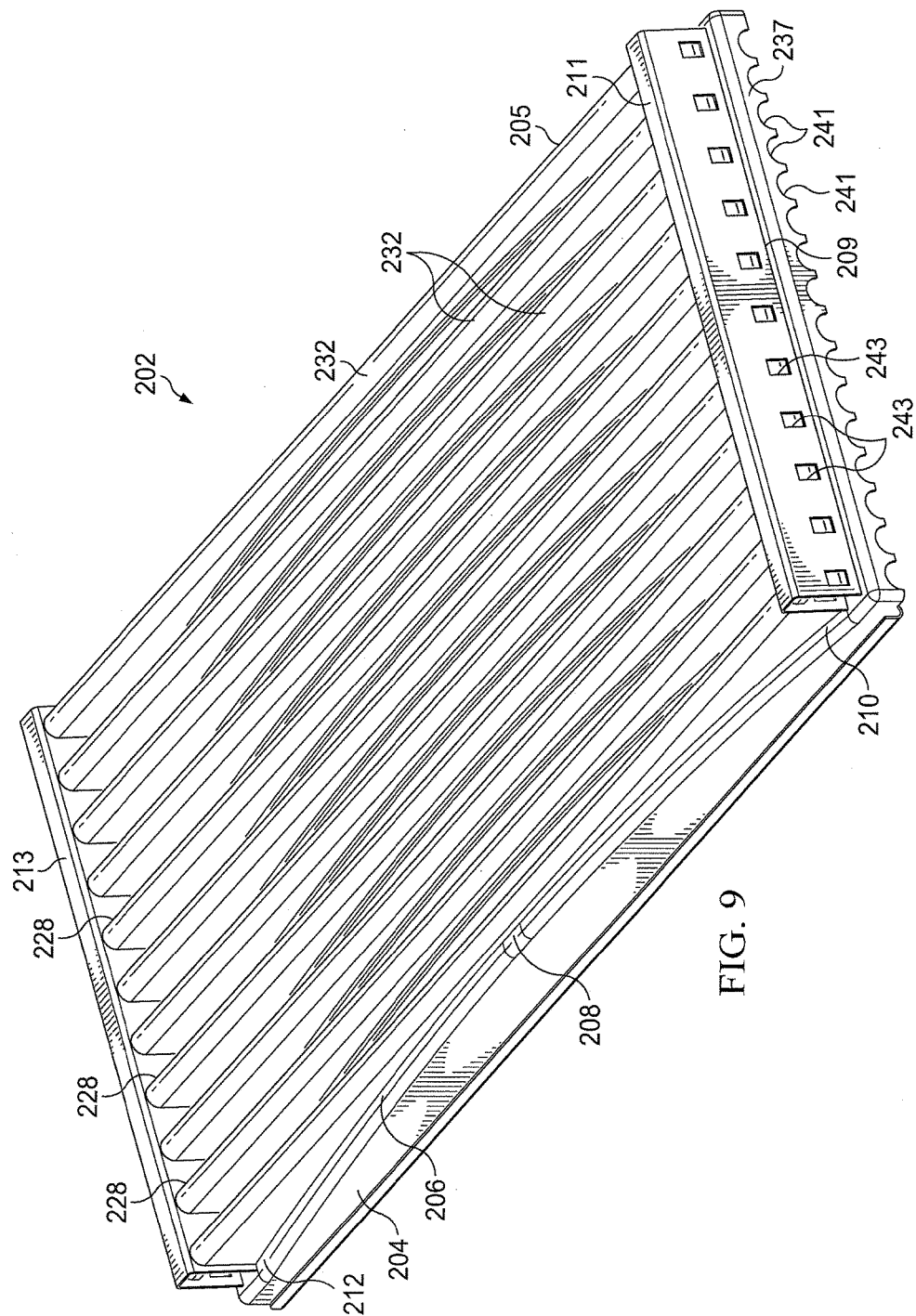
FIG. 9 is a top perspective view of an alternative embodiment 202 of the inventive cooking grate assembly.
Figure 10:
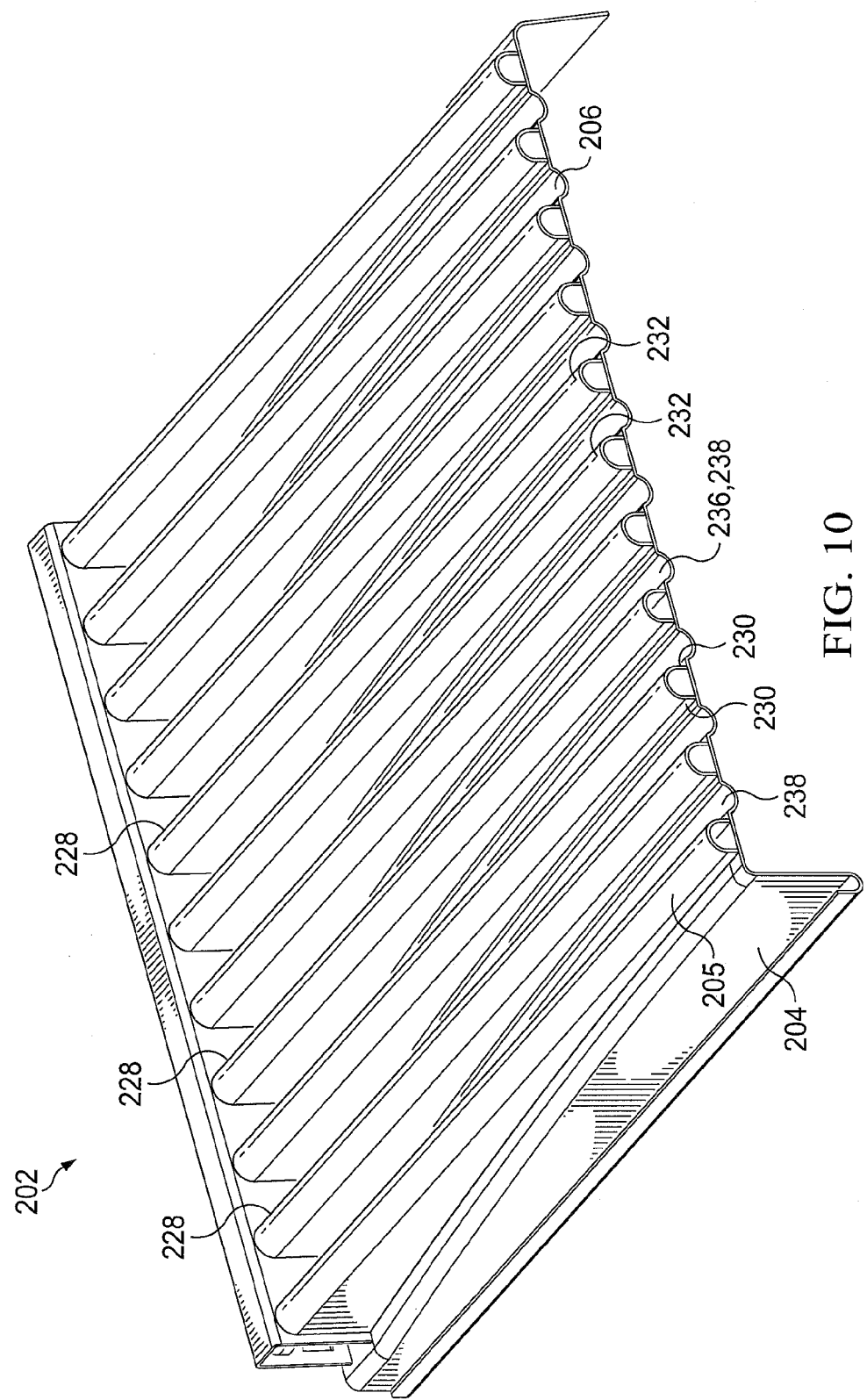
FIG. 10 is a cross-sectional perspective view (lateral cross-section) of the inventive cooking grate assembly 202.
Figure 11:
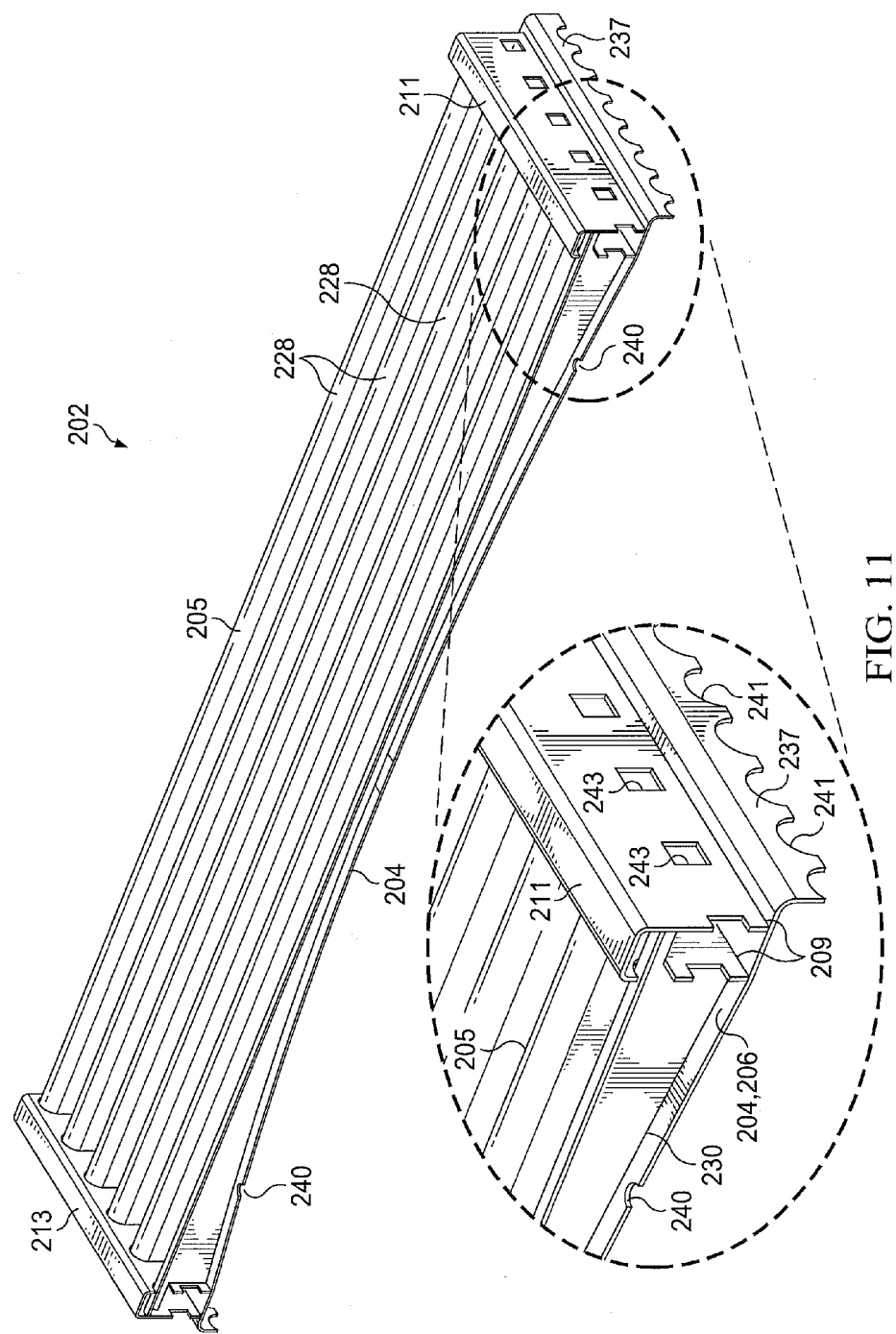
FIG. 11 is another cross-sectional perspective view (longitudinal cross-section) of the inventive cooking grate assembly 202.

As seen in the longitudinal cross-sectional view provided in FIG. 7, the contour of the upper surface 206 of the convex emitter tray 204 is such that (a) the highest point 208 of the convex upper surface 206 is preferably located substantially at the longitudinal center of the emitter tray 204 and (b) the upper surface 206 has two low points 210 and 212 which are preferably located at substantially the longitudinal ends of the convex tray 204. Consequently, fat and grease materials which fall onto the convex upper surface 206 of the tray 204 will flow down the convex upper surface 204 to the outer longitudinal ends 210 and 212 thereof.

When the hot fat and grease reaches the longitudinal outer ends 210 and 212 of the convex tray 204, the material will drain beneath the unsealed bottom edges 209 of the crosspieces 211 and 213 of the food support grate 205.

In order to prevent flaring within the grill firebox, the hot grease and fat which flows over the longitudinal ends 210 and 212 of the emitter tray 204 will drain through apertures 218 provided through the interior front and back tray support ledges 214 and 216 of the grill housing 203. The grease and fat material will then run down the outside surfaces of the front and back walls 222 and 224 of the grill housing 203 and fall onto an extended drip pan 226 provided beneath the firebox bottom wall 229.

The convex emitter tray 204 and the ribs 228 of the food support grate 205 will preferably have dimensions corresponding to those of the concave cooking grate assembly 115 described above except that the contour of the convex upper surface 206 of the convex emitter tray 204 is essentially the inverse of the contour of the concave upper surface 145 of the concave emitter tray 142.

Consequently, the height of the convex upper surface 206 of the tray 204 at its highest point 208 will preferably be not more than 1.5 inches, more preferably not more than 1.25 inches, above the elevation of the forward and rearward longitudinal ends 210 of the upper surface 206. More preferably, the height of the convex surface 206 at the highest point 208 will be in the range of from about 0.5 to about 1 inch above the elevation of the lowest outer points 210 and 212 of the convex upper surface 206.

Additionally, the longitudinally extending bottom edges 230 of the food support ribs 228 of the food support grate 205 will preferably be configured and shaped to match the contour of the convex upper surface 206 of the emitter tray 204 so that, when the food support grate 205 is placed on the tray 204, the bottom edges 230 of the food support ribs 228 will run along and contact the convex longitudinal contour of the emitter tray 204.

The height of the ribs 228 will preferably be such that (a) at the highest point 208 of the convex upper surface 206 at the mid portion of the tray 204, the horizontally-extending tops 232 of the ribs 228 will preferably be in the range of from about 0.25 to about 0.75 inch, more preferably from about ⅜ to about ⅝ inch, above the upper surface 206 of the tray 204 and (b) the horizontally-extending tops 232 of the ribs 228 will preferably be in the range of from about 0.5 to about 1.75 inches, more preferably from about 0.625 to about 1.25 inches and more preferably from about 0.875 to about 1.125 inches, above the upper surface 206 of the concave emitter tray 204 at the outer longitudinal ends 210 and 212 of the tray 204.

For the same reasons discussed above regarding concave tray 142, shallow longitudinal channels 236, or longitudinal raised features, can optionally be formed in the convex upper surface 206 of the emitter tray 204 such that the longitudinal channels 236 or raised features will be positioned at the bottoms of the gaps 238 between the parallel ribs 228.

Apertures 240 can also optionally be provided through the convex emitter tray 204 beneath the ribs 228 so that hot combustion gases will flow upwardly through the holes 240 and heat the hollow ribs 228. Such holes 240 will preferably be provided in the outer longitudinal regions of the convex tray 204 to heat the outer portions of the ribs 228 to thereby provide more even heat distribution from front to back.

Downwardly extending tray support pieces 237 are provided on the front and back longitudinal ends of the convex trays 204 for supporting the convex trays 204 on the interior front and back support ledges 214 and 216, of the housing 203. To facilitate the upward flow of hot combustion gas between the longitudinal ends of each inventive convex cooking grate assembly 202 and the front and back interior walls 222 and 224 of the grill housing 203, vertical gas flow windows or slots 241 are provided in the support pieces 237. Additionally, windows 243 are provided in the outer walls of the support grate cross pieces 211 and 214 for venting combustion gas which flows into the food support ribs 228 via the tray apertures 240.

In an alternative embodiment of the inventive grill 200, the convex emitter tray 204 can be replaced with other types of upwardly projecting emitter trays having, for example, inverted V or rounded inverted V shapes. Further, in yet another alternative embodiment, the convex emitter tray 204 of the grill 200 could be replaced with an emitter tray which simply slopes downwardly from one longitudinal end to the other, preferably from front to back, so that all of the grease and fat which falls onto the sloped tray will drain from the lower longitudinal end thereof.

In each of the embodiments of the inventive grill and the inventive grate assembly described above, the contours of the inventive emitter trays not only facilitate the drainage of grease and fat materials in a manner which prevents flareups both above and below the grate assembly, but the contour of the emitter tray also operates to provide a more even flux of infrared cooking energy in the cooking plane at the tops of the food support ribs. In large part, a more even transfer of heat over the entire cooking plane is provided because (a) the lower portions of the emitter tray which are further away from the cooking plane are closer to the burner elements within the grill housing and (b) the routing of the combustion gas upwardly through the lateral gaps adjacent to the front and back walls of the grill housing operates to provide additional beneficial heat to the outer longitudinal ends of the inventive cooking grate assemblies. Further, the shallow contour of the inventive concave and convex emitter tray assemblies also provides improved energy efficiency, increases the percentage of infrared cooking energy transferred to the food, and provides a less bulky design which is easier to handle for cleaning.

Thus, the present invention is well adapted to carry out the objects and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims.

What is claimed is:

1. An apparatus for supporting food for cooking comprising:
    an emitter tray having an upper surface, said upper surface having a longitudinal forward end, a longitudinal rearward end, a right lateral side, a left lateral side and a longitudinally contoured shape including a longitudinally forward upper region which extends laterally across said longitudinal forward end from said right lateral side to said left lateral side, a longitudinally rearward upper region which extends laterally across said longitudinal rearward end from said right lateral side to said left lateral side, and an intermediate lower region which extends laterally from said right lateral side to said left lateral side across a longitudinal mid-portion of said upper surface between said longitudinally forward and said longitudinally rearward upper regions;
    said longitudinally forward and rearward upper regions of said upper surface being elevationally higher than said intermediate lower region so that fat or grease which drips onto said upper regions of said upper surface flows from said upper regions toward said intermediate lower region;

food support structure removably positionable on said upper surface of said emitter tray so that a forward longitudinal end of said food, support structure rests on said longitudinal forward end of said upper surface and a rearward longitudinal end of said food support structure rests on said longitudinal rearward end of said upper surface;

said food support structure comprising a plurality of longitudinal, side-by-side, spaced apart food support ribs which extend continuously from said forward longitudinal end to said rearward longitudinal end of said food support structure; and said food support ribs having longitudinally straight tops and longitudinally contoured bottoms which are shaped in a manner corresponding to said longitudinally contoured shape of said upper surface of said emitter tray such that, (i) a first vertical distance downwardly from said straight tops to said longitudinally contoured bottoms at a longitudinal mid-portion of said food support ribs is greater than a second vertical distance downwardly from said straight tops to said longitudinally contoured bottoms of said food support ribs at said forward and said rearward longitudinal ends of said food support structure, (ii) when said food support structure is removably positioned on said upper surface of said emitter tray, said longitudinally contoured bottoms of said food support ribs run in continuous longitudinal contact with said longitudinally contoured shape of said upper surface of said emitter tray from said longitudinal forward end to said longitudinal rearward end of said upper surface, and (iii) by continuously contacting said upper surface of said emitter tray in said intermediate lower region and said longitudinally forward and rearward upper regions of said upper surface, said food support ribs block lateral air flow across said upper surface of said emitter tray in said intermediate lower region and said longitudinally forward and rearward upper regions of said upper surface.

2. The apparatus of claim 1 wherein each of said food support ribs is a hollow structure, said longitudinally straight tops are closed, each of said food support ribs comprises a pair of longitudinally extending side walls, said longitudinally contoured bottoms of said food support ribs are open, and said spaced apart food support ribs of said food support structure have spaces therebetween which are open.

3. The apparatus of claim 2 wherein said side walls of said food support ribs have longitudinally extending bottom edges, wherein said longitudinally extending bottom edges are said longitudinally contoured bottoms of said food support ribs so that, when said food support structure is removably positioned on said upper surface of said emitter tray, said longitudinally extending bottom edges of said side walls of said food support ribs run in continuous longitudinal contact with said longitudinally contoured shape of said upper surface of said emitter tray from said longitudinal forward end to said longitudinal rearward end of said upper surface of said emitter tray.

4. The apparatus of claim 3 wherein said longitudinally extending bottom edges of said side walls of said food support ribs contact said upper surface of said emitter tray in a non-sealing manner such that fat and grease which drips onto said upper surface of said emitter tray in said spaces between said food support ribs flows between said longitudinally extending bottom edges of said side walls, and said upper surface of said emitter tray.

5. The apparatus of claim 4 wherein said upper surface of said emitter tray has a concave longitudinal shape.

6. The apparatus of claim 4 further comprising a lateral series of drainage apertures in said emitter tray located in said intermediate lower region of said upper surface, said drainage apertures being positioned such that said drainage apertures are beneath and covered by said bottoms of said food support ribs when said food support structure is removably positioned on, said upper surface of said emitter tray and wherein said emitter tray has no apertures therein which are located in said spaces between said food support ribs when said food support structure is removably positioned on said upper surface of said emitter tray.

7. The apparatus of claim 6 further comprising a drainage channel extending laterally under said emitter tray beneath said lateral series of said drainage apertures.

8. An apparatus for cooking comprising:
a housing and
a cooking grate assembly positioned within said housing or proximate an upper end of said housing,
wherein said cooking grate assembly comprises:
an emitter tray having an upper surface, said upper surface having a longitudinal forward end, a longitudinal rearward end, a right lateral side, a left lateral side and a longitudinally contoured shape including a longitudinally forward upper region which extends laterally across said longitudinal forward end from said right lateral side to said left lateral side, a longitudinally rearward upper region which extends laterally across said longitudinal rearward end from said right lateral side to said left lateral side, and an intermediate lower region which extends laterally from said right lateral side to said left lateral side across a longitudinal mid-portion of said upper surface between said longitudinally forward and said longitudinally rearward upper regions;

said longitudinally forward and rearward upper regions of said upper surface being elevationally higher than said intermediate lower region so that fat or grease which drips onto said upper regions of said upper surface flows from said upper regions toward said intermediate lower region;

a food support structure removably positionable on said upper surface of said emitter tray so that a forward longitudinal end of said food support structure rests on said longitudinal forward end of said upper surface and a rearward longitudinal end of said food support structure rests on said longitudinal rearward end of said upper surface;

said food support structure comprising a plurality of longitudinal, side-by-side, spaced apart food support ribs which extend continuously from said forward longitudinal end to said rearward longitudinal end of said food support structure; and said food support ribs having longitudinally straight tops and longitudinally, contoured bottoms which are shaped in a manner corresponding to said longitudinally contoured shape of said upper surface of said emitter tray such that, (i) a first vertical distance downwardly from said straight tops to said longitudinally contoured bottoms at a longitudinal mid-portion of said food support ribs is greater than a second vertical distance downwardly from said straight tops to said longitudinally contoured bottoms of said food support ribs at said forward and said rearward longitudinal ends of said food support structure, (ii) when said food support structure is removably positioned on said upper surface of said emitter tray, said longitudinally contoured bottoms of said food support ribs run in continuous longitudinal contact with said longitudinally contoured shape of said upper surface of said emitter tray from said longitudinal forward end to said longitudinal rearward end of said upper surface, and (iii) by continuously contacting said upper surface of said emitter tray in said intermediate lower region and said longitudinally forward and rearward upper regions of said upper surface, said food support ribs block lateral air flow across said upper surface of said emitter tray in said intermediate lower region and said longitudinally forward and rearward upper regions of said upper surface.

9. The apparatus of claim 8 wherein each of said food support ribs is a hollow structure, said longitudinally straight tops are closed, each of said food support ribs comprises a pair of longitudinally extending side walls, said longitudinally contoured bottoms of said food support ribs are open, and said spaced apart food support ribs of said food support structure have spaces therebetween which are open.

10. The apparatus of claim 9 wherein said side, walls of said food support ribs have longitudinally extending bottom edges, wherein said longitudinally extending bottom edges are said longitudinally contoured bottoms of said food support ribs so that, when said food support structure is removably positioned on said upper surface of said emitter tray, said longitudinally extending, bottom edges of said side walls of said food support ribs run in continuous longitudinal contact with said longitudinally contoured shape of said upper surface of said emitter tray from said longitudinal forward end to said longitudinal rearward end of said upper surface of said emitter tray.

11. The apparatus of claim 10 wherein said longitudinally extending bottom edges of said side walls of said food support ribs contact said upper surface of said emitter tray in a non-sealing manner such that fat and grease which drips onto said upper surface of said emitter tray in said spaces between said food support ribs flows between, said longitudinally extending bottom edges of said side walls and said upper surface of said emitter tray.

12. The apparatus of claim 11 wherein said upper surface of said emitter tray has a concave longitudinal shape.

13. The apparatus of claim 11 wherein said cooking grate assembly further comprises a lateral series of drainage apertures in said emitter tray located in said intermediate lower region of said upper surface, said drainage apertures being positioned such that said drainage apertures are beneath and covered by said bottoms of said food support ribs when said food support structure is removably positioned on said upper surface of said emitter tray and wherein said emitter tray has no apertures therein which are located in said spaces between, said trod support ribs when said food support structure is removably positioned or said upper surface of said emitter tray.

14. The apparatus of claim 13 wherein said cooking grate assembly further comprises a drainage channel extending laterally under said emitter tray beneath said lateral series of said drainage apertures.

* * * * *

UNITED STATES PATENT AND TRADEMARK OFFICE
CERTIFICATE OF CORRECTION

| | | |
|---|---|---|
| PATENT NO. | : 9,775,465 B2 | Page 1 of 1 |
| APPLICATION NO. | : 13/893579 | |
| DATED | : October 3, 2017 | |
| INVENTOR(S) | : Mallik Ahmed | |

It is certified that error appears in the above-identified patent and that said Letters Patent is hereby corrected as shown below:

In the Claims

Claim 6, Column 12, Line 11: Delete the "," after the word "on"

Claim 10, Column 13, Line 24: Delete the "," after the word "side"

Claim 11, Column 14, Line 10: Delete the "," after the words "flows between" and before the word "said"

Claim 13, Column 14, Line 24: Replace the word "trod" with "food"

Claim 13, Column 14, Line 25: Replace the word "or" with "on"

Signed and Sealed this
Seventh Day of November, 2017

Joseph Matal
*Performing the Functions and Duties of the*
*Under Secretary of Commerce for Intellectual Property and*
*Director of the United States Patent and Trademark Office*